US012739895B2

(12) United States Patent
Liu

(10) Patent No.: US 12,739,895 B2
(45) Date of Patent: Sep. 15, 2026

(54) METHOD AND ELECTRONIC DEVICE FOR SESSION ESTABLISHMENT, AND STORAGE MEDIUM

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 488 days.

(21) Appl. No.: 18/090,607

(22) Filed: Dec. 29, 2022

(65) Prior Publication Data

US 2023/0144620 A1 May 11, 2023

Related U.S. Application Data

(63) Continuation of application No. PCT/CN2020/106316, filed on Jul. 31, 2020.

(51) Int. Cl.

| | |
|---|---|
| ***H04W 76/00*** | (2018.01) |
| ***H04W 8/20*** | (2009.01) |
| ***H04W 76/10*** | (2018.01) |
| *H04W 84/04* | (2009.01) |
| *H04W 92/18* | (2009.01) |

(52) U.S. Cl.

CPC ............ *H04W 76/10* (2018.02); *H04W 8/20* (2013.01); *H04W 84/042* (2013.01); *H04W 92/18* (2013.01)

(58) Field of Classification Search

None

See application file for complete search history.

(56) References Cited

U.S. PATENT DOCUMENTS

| | | | |
|---|---|---|---|
| 10,530,461 | B2 | 1/2020 | Sadiq |
| 10,609,744 | B2 | 3/2020 | Kim |
| 10,932,175 | B2 | 2/2021 | Kim |
| 2011/0238807 | A1 | 9/2011 | Lee et al. |
| 2015/0029866 | A1 | 1/2015 | Liao et al. |
| 2015/0036578 | A1 | 2/2015 | Wu et al. |
| 2015/0172846 | A1 | 6/2015 | Ge et al. |
| 2016/0285539 | A1 | 9/2016 | Sadiq et al. |
| 2016/0381720 | A1 | 12/2016 | Baek et al. |
| 2017/0093541 | A1 | 3/2017 | Pan et al. |
| 2018/0139695 | A1 | 5/2018 | Gupta et al. |
| 2018/0279195 | A1 | 9/2018 | Kim et al. |

(Continued)

FOREIGN PATENT DOCUMENTS

| | | | |
|---|---|---|---|
| CN | 106507504 | A | 3/2017 |
| CN | 107852591 | A | 3/2018 |

(Continued)

OTHER PUBLICATIONS

3GPP TR 23.752 V0.4.0 (Jun. 2020).*

(Continued)

*Primary Examiner* — Abdelillah Elmejjarmi

(74) *Attorney, Agent, or Firm* — Ladas & Parry LLP

(57) ABSTRACT

A session establishment method, including: determining, by an electronic device, Relay Service Code (RSC) information; and determining, based on the RSC information, parameter information used to establish a relay session. An electronic device and a non-transitory storage medium are further provided.

18 Claims, 3 Drawing Sheets

(56) References Cited

U.S. PATENT DOCUMENTS

| | | | | |
|---|---|---|---|---|
| 2018/0317077 | A1 | 11/2018 | Kim et al. | |
| 2019/0387429 | A1 | 12/2019 | Basu Mallick et al. | |
| 2020/0053547 | A1 | 2/2020 | Baek et al. | |
| 2020/0100167 | A1 | 3/2020 | Cheng et al. | |
| 2020/0178343 | A1 | 6/2020 | Kim | |
| 2021/0250749 | A1 * | 8/2021 | Cheng | H04W 8/005 |
| 2022/0330361 | A1 * | 10/2022 | Ding | H04W 48/10 |

FOREIGN PATENT DOCUMENTS

| | | | |
|---|---|---|---|
| CN | 109076639 | A | 12/2018 |
| CN | 109246688 | A | 1/2019 |
| CN | 110169097 | A | 8/2019 |
| EP | 4072234 | A1 | 10/2022 |
| WO | 2017015788 | A1 | 2/2017 |

OTHER PUBLICATIONS

Second Office Action of the European application No. 20947286.9, issued on Aug. 22, 2024. 8 pages.

First Office Action of the European application No. 20947286.9, issued on Feb. 22, 2024, 7 pages.

"3rd Generation Partnership Project; Technical Specification Group Services and System Aspects; Study on system enhancement for Proximity based Services (ProSe) in the 5G System (5GS) (Release17)", 3GPP TR23.752, 3rd Generation Partnership Projec(3GPP), Mobile Competence Centre; 650,Route Des Lucioles; F-06921Sophia-Antipolis Cedex; France, No. v0.4.0, Jun. 25, 2020 (Jun. 25, 2020), pp. 1-121, XP051924131, section 6.16.3;p. 66-p. 67, section 6.28;p. 95, line 1-line 41, sections 6.38.1-6.38.2; p. 112-p. 114.

Supplementary European Search Report in the European application No. 20947286.9, mailed on Jul. 28, 2023, 12 pages.

Philips International B.V. "UE-to-Network Relay discovery and handling of PDU session parameters with Remote UE based relay selection.", SA WG2 Meeting #139e S2-2004202, Elbonia, Jun. 1-12, 2020.

InterDigital Inc."Solution for KI #3: Support of UE-to-Network Relay", SA WG2 Meeting #136 S2-1911798, Nov. 18-22, 2019, Reno, US.

International Search Report in the international application No. PCT/CN2020/106316, mailed on Apr. 25, 2021.

English translation of the Written Opinion of the International Search Authority in the international application No. PCT/CN2020/106316, mailed on Apr. 25, 2021.

International Search Report in the international application No. PCT/CN2020/106436, mailed on Apr. 16, 2021. 7 pages with English translation.

Written Opinion of the International Search Authority in the international application No. PCT/CN2020/106436, mailed on Apr. 16, 2021. 9 pages with English translation.

Philips International B.V. "UE-to-Network Relay Discovery and Handling of PDU Session Parameters with CN Based Relay Selection", SA WG2 Meeting #139e S2-2004201, May 22, 2020 (May 22, 2020), pp. 1-6.

Interdigital Inc. "KI#3, New Solution #X: L3 UE-to-Network Relay Discovery and Connection Establishment", SA WG2 Meeting #S2-139E S2-2004733, Jun. 12, 2020 (Jun. 12, 2020), pp. 1-2.

Supplementary European Search Report in the European application No. 20947053.3, mailed on Jun. 30, 2023. 9 pages.

First Office Action of the European application No. 20947053.3, issued on Nov. 30, 2023. 5 pages.

First Office Action of the Chinese application No. 202310349584.2, issued on Jul. 24, 2024. 17 pages with English translation.

First Office Action of the U.S. Appl. No. 18/096,201, issued on Aug. 13, 2025.

First Office Action of the Chinese application No. 202310372197.0, issued on Nov. 12, 2025.

* cited by examiner

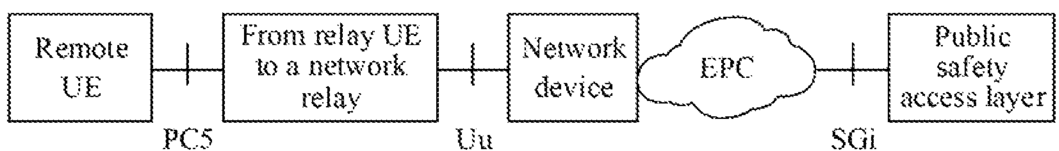

FIG. 1

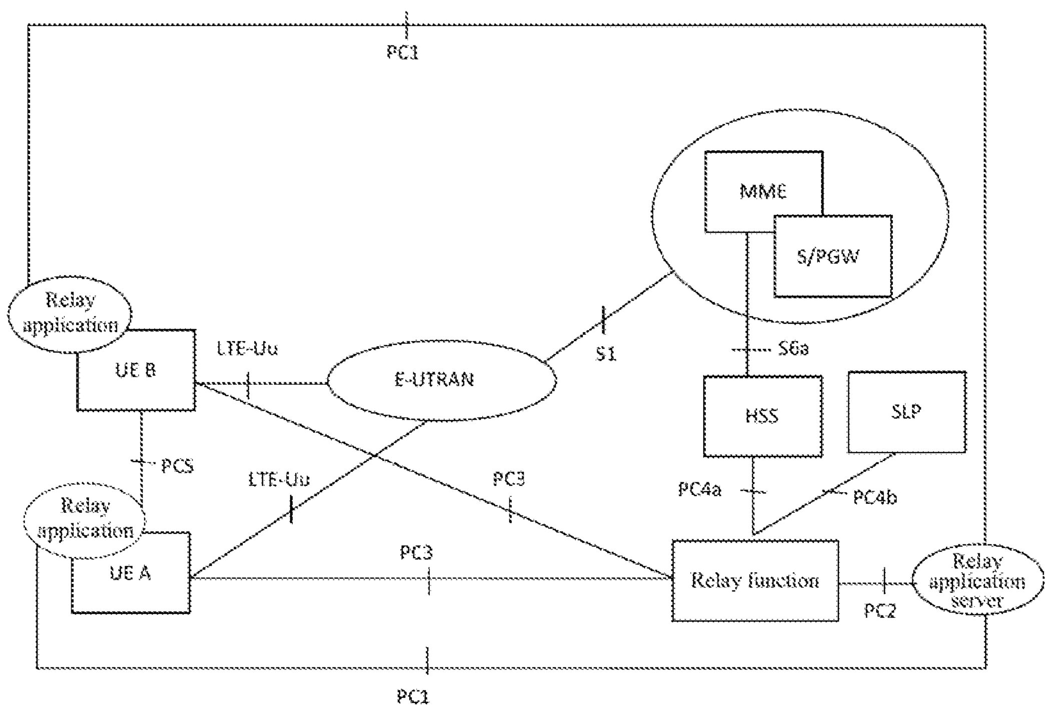

FIG. 2

Remote UE
From relay UE to a network relay
Network device
MME
S-GW
P-GW
1 E-UTRAN initial attach and/or request for PDN connection
Mode A
or
mode B
2.Discovery procedure
3.Establishment of one-to-one connection
3.Relay UE establishes a new PDN connection for the relay
4.IP address/prefix allocation
5.Remote UE report (ID and IP information of a remote user)
6.Relay UE report (ID and IP information of a relay user)
Relay service

FIG. 3

METHOD AND ELECTRONIC DEVICE FOR SESSION ESTABLISHMENT, AND STORAGE MEDIUM

CROSS REFERENCE TO RELATED APPLICATION

This is a continuation of International Application No. PCT/CN2020/106316 filed on Jul. 31, 2020, the disclosure of which is hereby incorporated by reference in its entirety.

BACKGROUND

In relay communication, in order to solve the problem of service attribute privacy, a Relay Service Code (RSC) is introduced. How an electronic device including a remote device and/or a relay device establishes a relay session according to the RSC has not been clarified.

SUMMARY

The present disclosure relates to the field of wireless communication technologies, in particular to a method for session establishment, an electronic device, and a storage medium.

In a first aspect, the embodiments of the present disclosure provide a method for session establishment, which includes: determining, by an electronic device. RSC information, and determining, based on the RSC information, parameter information used to establish a relay session.

In a second aspect, the embodiments of the present disclosure provide an electronic device, which includes: a processor, a transceiver, and a memory configured to store a computer program executable by the processor, herein the processor is configured to perform operations of: determining RSC information; and determining, based on the RSC information, parameter information used to establish a relay session.

In a third aspect, the embodiments of the present disclosure provide a non-transitory storage medium having stored thereon computer-executable instructions that, when executed by a processor, cause the processor to perform operations of: determining RSC information; and determining, based on the RSC information, parameter information used to establish a relay session.

BRIEF DESCRIPTION OF THE DRAWINGS

FIG. 1 is a schematic diagram of a network structure of a relay according to an embodiment of the present disclosure.

FIG. 2 is a schematic diagram of network architecture in a Long Term Evolution (LTE) system according to an embodiment of the present disclosure.

FIG. 3 is a schematic diagram of relaying from a relay device to a network device according to an embodiment of the present disclosure.

DETAILED DESCRIPTION

Figures 4, 5, 6:
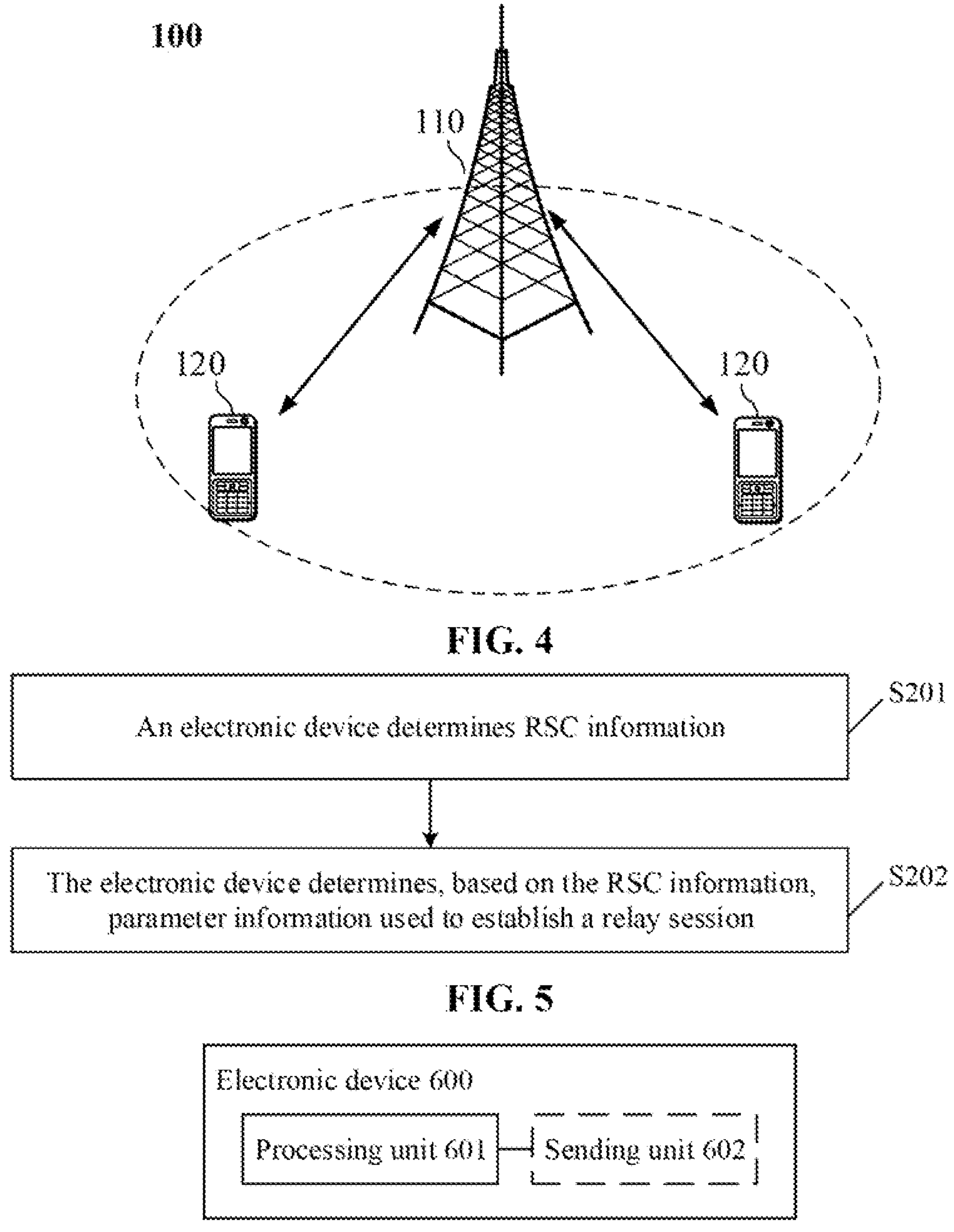
FIG. 4 is a schematic structural diagram of a communication system according to an embodiment of the present disclosure.
FIG. 5 is a flowchart of an optional processing of a method for session establishment according to an embodiment of the present disclosure.
FIG. 6 is an optional schematic structural diagram of an electronic device according to an embodiment of the present disclosure.

In order to provide a more detailed understanding of the features and technical contents of the embodiments of the present disclosure, the implementation of the embodiments of the present disclosure will be described in detail below with reference to the drawings, and the drawings are for illustrative purposes only and are not intended to limit the embodiments of the present disclosure.

Before the description of the embodiments of the present disclosure, the relevant content is briefly described.

In version 13 (Rel-13 ProSe), the 3rd Generation Partnership Project (3GPP) introduces a User Equipment (UE)-to-network relay function based on a layer 3 relay. A schematic diagram of a network structure of the relay is shown in FIG. 1. Remote UE accesses a network through relay UE. The relay UE bears the relay function of an Internet Protocol (IP) layer, and transports data between the remote UE and the network. The remote UE and the relay UE are connected through a sidelink. Before the relay function is performed between the remote UE and the relay UE, the remote UE and the relay UE need to be authorized. In a LTE system, network architecture is shown in FIG. 2. The authorization of the remote UE and the relay UE is implemented by a relay function (ProSe Function) entity through a PC3 interface.

A schematic diagram of relaying from a relay device to a network device is shown in FIG. 3. In order to transport the relay data of the remote device, the relay device needs to use an appropriate Protocol Data Unit (PDU) session. Which PDU session is used to transport relay data is determined by the relay device. The relay device establishes parameters that need to respond when relaying the PDU session. In a normal session establishment, the relay device determines parameters needed to establish the PDU session according to a User Equipment Routing Selection Policy (URSP) configured by the network.

However, in order to solve the problem of service attribute privacy, after the introduction of the RSC, one RSC may represent one service attribute. The remote device or the relay device needs to obtain parameter information related to session establishment from one RSC.

The technical solutions of the embodiments of the present disclosure may be applied to various communications systems, such as a Global System of Mobile communications (GSM), a Code Division Multiple Access (CDMA) system, a Wideband Code Division Multiple Access (WCDMA) system, a General Packet Radio Service (GPRS) system, a LTE system, a LTE Frequency Division Duplex (FDD) system, a LTE Time Division Duplex (TDD) system, an Advanced Long Term Evolution (LTE-A) system, an New Radio (NR) system, an evolution system of the NR system, an LTE-based Access to Unlicensed Spectrum (LTE-U) system, a NR-based Access to Unlicensed Spectrum (NR-U) system, a Universal Mobile Telecommunications System (UMTS), a Worldwide Interoperability for Microwave Access (WiMAX) communications system, a Wireless Local Area Network (WLAN), Wireless Fidelity (WiFi), a next generation of communication systems, or other communication systems.

System architecture and service scenarios described in the embodiments of the present disclosure are intended to describe the technical solutions in the embodiments of the present disclosure more clearly, but are not intended to limit the technical solutions provided in the embodiments of the present disclosure. Those of ordinary skill in the art may know that as the network architecture evolves and a new service scenario emerges, the technical solutions provided in the embodiments of the present disclosure are also applicable to a similar technical problem.

The network device involved in the embodiments of the present disclosure may be a common base station (such as a NodeB (NB) or an Evolved Node B (eNB) or a gNB), a NR controller, a centralized unit, a NR base station, a remote radio module, a micro base station, a relay, a distributed unit, a Transmission Reception Point (TRP), a Transmission Point (TP) or any other devices. No limits are made to specific technologies and specific device forms adopted by the network device in the embodiments of the present disclosure. In order to facilitate description, in all embodiments of the present disclosure, the above apparatuses with a wireless communication function provided for the terminal device are collectively referred to a network device.

In the embodiments of the present disclosure, the terminal device may be any terminal. For example, the terminal device may be UE in Machine Type Communication (MTC). That is to say, the terminal device may also be called UE, a Mobile Station (MS), a mobile terminal, a terminal, etc. The terminal device may communicate with one or more core networks through a Radio Access Network (RAN). For example, the terminal device may be a mobile terminal (or referred to as a "cellular" phone) and a computer with a mobile terminal. For example, the terminal device may also be a portable, pocket-sized, hand-held, computer built-in, or in-vehicle mobile apparatus, which exchanges language and/or data with the RAN. No specific limits are made thereto in the embodiments of the present disclosure.

Optionally, the network device and the terminal device may be deployed on land, including indoors or outdoors, and may be held in hands or deployed in vehicles, or may be deployed on water, or may be deployed on an aircraft, a balloon, and an artificial satellite in the air. No limits are made to the application scenario of the network device and the terminal device in the embodiments of the present disclosure.

Optionally, communication may be performed between the network device and the terminal device and between the terminal devices through a licensed spectrum, or through an unlicensed spectrum, or through the licensed spectrum and the unlicensed spectrum simultaneously. Communication may be performed between the network device and the terminal device and between the terminal devices through a spectrum below 7 gigahertz (GHz), or through a spectrum above 7 GHz, or through the spectrum below 7 GHz and above 7 GHz simultaneously. No limits are made to the spectrum resource used between the network device and the terminal device in the embodiments of the present disclosure.

Generally speaking, traditional communication systems support a limited number of connections and are easy to implement. However, with the development of the communication technologies, mobile communication systems will not only support traditional communication, but also support, for example, Device to Device (D2D) communication, Machine to Machine (M2M) communication, MTC, and Vehicle to Vehicle (V2V) communication, etc. The embodiments of the present disclosure may also be applied to these communication systems.

Exemplarily, a communication system 100 applied to the embodiment of the present disclosure is shown in FIG. 4. The communication system 100 may include a network device 110, and the network device 110 may be a device communicating with a terminal device 120 (or called a communication terminal, a terminal). The network device 110 may provide communication coverage for a particular geographical region and may communicate with a terminal device located in the coverage region. Optionally, the network device 110 may be a Base Transceiver Station (BTS) in the GSM or the CDMA system, may also be a NB in the WCDMA system, and may further be an eNB or eNodeB in the LTE system or a wireless controller in a Cloud Radio Access Network (CRAN). Or the network device may be a mobile switching center, a relay station, an access point, an in-vehicle device, a wearable device, a hub, a switch, a network bridge, a router, a network-side device in a 5G network, a network device in a future evolved Public Land Mobile Network (PLMN) or the like.

The communication system 100 also includes at least one terminal device 120 located within coverage of the network device 110. As used herein, the "terminal device" includes, but is not limited to be connected: via a wired line, such as via a Public Switched Telephone Networks (PSTN), a Digital Subscriber Line (DSL), a digital cable, a direct cable connection; and/or another data connection/network; and/or via a wireless interface, for example, for a cellular network, a Wireless Local Area Network (WLAN), a digital television network such as a DVB-H network, a satellite network, a AM-FM broadcast transmitter; and/or means of another terminal device arranged to receive/transmit communication signals; and/or an Internet of Things (IoT) device. The terminal device configured to communicate through a wireless interface may be referred to as a "radio communication terminal", a "radio terminal" or a "mobile terminal". Examples of the mobile terminal include, but are not limited to: a satellite or cellular telephone; a Personal Communications System (PCS) terminal that may combine a cellular radio telephone with data processing, facsimile, and data communication capabilities; a Personal Digital Assistant (PDA) that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal device may refer to an access terminal, UE, a user unit, a user station, a mobile station, a mobile radio station, a remote station, a remote terminal, a mobile device, a user terminal, a terminal, a radio communication device, a user agent, or a user device. The access terminal may be a cellular telephone, a cordless telephone, a Session Initiation Protocol (SIP) telephone, a Wireless Local Loop (WLL) station, a PDA, a handheld device having a radio communication function, a computing device or other processing device connected to a radio modem, an in-vehicle device, a wearable device, a terminal device in a 5G network, a terminal device in the future evolved PLMN, or the like.

Alternatively, D2D communication may be performed between the terminal devices 120.

Alternatively, a 5G system or 5G network may also be referred to as an NR system or an NR network.

FIG. 4 exemplarily illustrates a network device and two terminal devices. Alternatively, the communication system 100 may include a plurality of network devices and other numbers of terminal devices may be included within a coverage area of each network device, which are not limited in the embodiments of the present disclosure.

Alternatively, the communication system 100 may further include other network entities such as a network controller, a mobility management entity, which are not limited by the embodiments of the present disclosure.

It should be understood that a device having a communication function in a network/system in the embodiments of the present disclosure may be referred to as a communication device. As an example of the communication system 100 illustrated in FIG. 4, the communication device may include a network device 110 and a terminal device 120 having a communication function. The network device 110 and the terminal device 120 may be specific devices described above, and details are not described herein. The communication device may also include other devices in the communication system 100, such as network controllers, mobility management entities, and other network entities, which are not limited in the embodiments of the present disclosure.

A flowchart of an optional processing of a method for session establishment according to an embodiment of the present disclosure, as shown in FIG. 5, includes the following operations.

At S201, an electronic device determines RSC information.

At S202, the electronic device determines, based on the RSC information, parameter information used to establish a relay session.

In the embodiments of the present disclosure, the electronic device may be a relay device or a remote device. Herein, the electronic device may be a terminal device or a small base station. That is, the electronic device may be relay UE, or remote UE, or a relay small base station, or a remote small base station.

In a case that the electronic device is the relay device, for S201, the process of determining, by the electronic device, the RSC information may be as follows: during establishment of a PC5 connection, the relay device receives the RSC information sent by the remote device. The relay device and the remote device may establish a connection through a sidelink, that is, the RSC information is transported between the relay device and the remote device through the sidelink.

In a case that the electronic device is the relay device or the electronic device is the remote device, for S202, the process of determining, by the electronic device based on the RSC information, parameter information used to establish a relay session may be the same and may be as follows: the electronic device determines, according to a pre-configured rule, parameter information used to establish the relay session corresponding to the RSC information. The parameters of the relay session may include at least one or more of the following: network slice information, Data Network Name (DNN) information, Session Service Continuity (SSC) information and a PDU session type.

In some optional implementations, the pre-configured rule includes at least one of: a first number of bits of information in the RSC information corresponding to first network slice information in the parameter information used to establish the relay session; a second number of bits of information in the RSC information corresponding to first DNN information in the parameter information used to establish the relay session; a third number of bits of information in the RSC information corresponding to first SSC information in the parameter information used to establish the relay session; or a fourth number of bits of information in the RSC information corresponding to a first PDU session type in the parameter information used to establish the relay session. That is, each part of bits of information in the RSC information corresponds to one of the parameter information used to establish the relay session. For example, the format of the RSC information is shown in Table 1 below, a network slice corresponding to the highest Nbit in the RSC information, and a DNN corresponding to the next highest Mbit in the RSC information are pre-configured, and the network slice information and the DNN information may be determined respectively according to the highest Nbit and the next highest Mbit information in the RSC information.

TABLE 1

| Slice information (Nbit) | DNN information (Mbit) | Application information |
|---|---|---|

Herein, the format of the RSC information is predetermined by a protocol, or configured through subscription information, or configured by a PLMN.

In some other optional implementations, the pre-configured rule includes at least one of: RSC information configured in a service description information field of a URSP rule; or the parameter information used to establish the relay session configured in a route selection descriptor. That is, the RSC is configured in the service description information field of the URSP; and/or, the parameter information used to establish the relay session is configured in the route selection descriptor.

Herein, if the RSC information is configured in the service description information field of the URSP, the URSP rule may be modified as shown in Table 2 below, and the bolded part is newly added information on the basis of the existing URSP rule.

TABLE 2

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| **Traffic descriptor** | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| **RSC** | **Relay Service Code** | | | |
| List of Route | A list of Route Selection Descriptors. | Mandatory | | |

TABLE 2-continued

| Information name | Description | Category | PCF permitted to modify in a UE context | Scope |
|---|---|---|---|---|
| Selection Descriptors | The components of a Route Selection Descriptor are described in table 6.6.2.1-3. | | | |

If the parameter information used to establish the relay session is configured in the route selection descriptor, the route selection descriptor may be modified as shown in Table 3 below. Herein, the bolded part is newly added information on the basis of the existing route selection descriptor table.

TABLE 3

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| **Route selection components** | This part defines the route selection components | Mandatory (NOTE 2 ) | | |
| **SSC Mode Selection** | **One single value of SSC mode. (NOTE 5)** | **Optional** | Yes | UE context |
| **Network Slice Selection** | **Either a single value or a list of values of S-NSSAI(s).** | **Optional (NOTE 3)** | Yes | UE context |
| **DNN Selection** | **Either a single value or a list of values of DNN(s).** | **Optional** | Yes | UE context |
| **PDU Session Type Selection** | **One single value of PDU Session Type** | **Optional** | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |

In some optional implementations, if the electronic device is the remote device, after the electronic device performs S202, it may also perform the following operations.

At S203, the electronic device sends the parameter information used to establish the relay session to a relay device.

In some embodiments, after the electronic device sends the parameter information used to establish the relay session to the relay device, the relay device establishes the PDU session according to the parameter information used to establish the relay session.

In the method for session establishment provided by the embodiments of the present disclosure, the relay device receives the RSC information sent by the remote device, and determines the parameter information used to establish the relay session corresponding to the RSC information according to the pre-configured rule; or after the remote device determines the parameter information used to establish the relay session corresponding to the RSC information according to the pre-configured rule, the remote device sends the parameter information used to establish the relay session to the relay device. In this way, the relay device may establish the relay session according to the parameter information.

In order to implement the method for session establishment provided by the embodiments of the present disclosure, the embodiments of the present disclosure further provide an electronic device. A schematic structural diagram of an electronic device 600, as shown in FIG. 6, includes a processing unit 601.

The processing unit 601 is configured to determine RSC information, and determine, based on the RSC information, parameter information used to establish a relay session.

In an optional implementation, the processing unit 601 is configured to receive the RSC information sent by a remote device.

In an optional implementation, the processing unit 601 is configured to receive the RSC information sent by the remote device during establishment of a PC5 connection.

In an optional implementation, the processing unit 601 establishes a connection with the remote device through a sidelink.

In an optional implementation, the electronic device 600 further includes: a sending unit 602.

The sending unit 602 is configured to send the parameter information used to establish the relay session to a relay device.

In an optional implementation, the processing unit 601 is configured to determine, according to a pre-configured rule, parameter information used to establish the relay session corresponding to the RSC information.

In an optional implementation, the pre-configured rule includes at least one of:

a first number of bits of information in the RSC information corresponding to first network slice information in the parameter information used to establish the relay session;

a second number of bits of information in the RSC information corresponding to first DNN information in the parameter information used to establish the relay session;

a third number of bits of information in the RSC information corresponding to first SSC information in the parameter information used to establish the relay session; or a fourth number of bits of information in the RSC information corresponding to a first PDU session type in the parameter information used to establish the relay session.

In an optional implementation, the format of the RSC information is predetermined by a protocol, or configured through subscription information, or configured by a PLMN.

In an optional implementation, the pre-configured rule includes at least one of: RSC information configured in a service description information field of a URSP rule; or the parameter information used to establish the relay session configured in a route selection descriptor.

It should be understood that, in various embodiments of the present disclosure, a magnitude of a sequence number of each process does not mean an execution sequence and the execution sequence of each process should be determined by its function and an internal logic and should not form any limit to an implementation process of the embodiments of the present disclosure.

The embodiments of the present disclosure further provide an electronic device, which includes: a processor and a memory configured to store a computer program executable by the processor. The processor is configured to execute the computer program to perform the method for session establishment executed by the above electronic device.

The embodiments of the present disclosure provide a chip, which includes: a processor, configured to call and execute a computer program from a memory, to cause a device installed with the chip to perform the method for session establishment executed by the above electronic device.

The embodiments of the present disclosure provide a storage medium, storing an executable program, which, when being executed by a processor, implements the method for session establishment executed by the above electronic device.

The embodiments of the present disclosure provide a computer program product, which includes: computer program instructions that, cause a computer to perform the method for session establishment executed by the above electronic device.

The embodiments of the present disclosure provide a computer program, causing a computer to perform the method for session establishment executed by the above electronic device.

Figure 7:
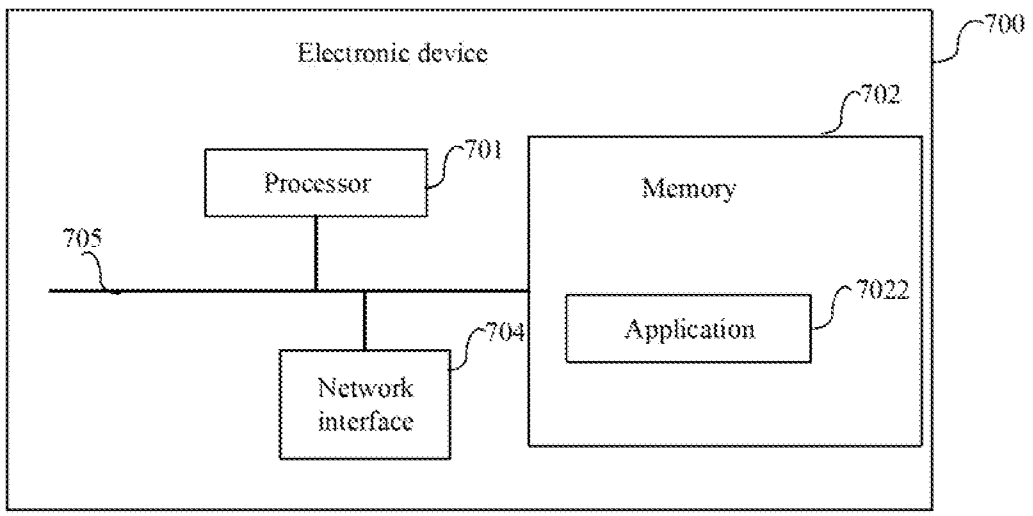
FIG. 7 is a schematic structural diagram of hardware of an electronic device according to an embodiment of the present disclosure.

FIG. 7 is a schematic structural diagram of hardware of an electronic device according to an embodiment of the present disclosure. The electronic device 700 includes at least one processor 701, a memory 702, and at least one network interface 704. The various components in the electronic device 700 are coupled together through a bus system 705. It should be understood that the bus system 705 is configured to implement connection communication among these components. The bus system 705 includes a data bus and further includes a power bus, a control bus and a state signal bus. However, for clear description, various buses are denoted as the bus system 705 in FIG. 7.

It will be understood that the memory 702 may be a volatile memory or a non-volatile memory, or may include both the volatile and non-volatile memories. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a read-only Compact Disc Read-Only Memory (CD-ROM). The magnetic surface memory may be a magnetic disk memory or a magnetic tape memory. The volatile memory may be a Random Access Memory (RAM), which functions as an external cache. By way of exemplary but not restrictive description, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Syncline Dynamic Random Access Memory (SLDRAM), a Direct Rambus Random Access Memory (DRRAM). The memory 702 described in the embodiments of the present disclosure is intended to include, but is not limited to, these and any other suitable types of memories.

The memory 702 in the embodiments of the present disclosure is used to store various types of data to support the operation of the electronic device 700. Examples of such data include any computer program for operation on electronic device 700, such as an application 7022. A program for implementing the method of the embodiments of the present disclosure may be included in the application 7022.

The method disclosed in the above embodiments of the present disclosure may be applied to or implemented by the processor 701. The processor 701 may be an integrated circuit chip having a signal processing capability. In an implementation, the operations of the above method may be performed by integrated logic circuits of hardware in the processor 701 or by instructions in the form of software. The processor 701 may be a general-purpose processor, a Digital Signal Processor (DSP), or other programmable logic devices, a discrete gate or a transistor logic device, a discrete hardware component or the like. The processor 701 may implement or perform the methods, operations and logical block diagrams disclosed in the embodiments of the present disclosure. The general-purpose processor may be a microprocessor or any conventional processor or the like. The operations of the method disclosed in connection with the embodiments of the present disclosure may be directly performed by a hardware decoding processor or performed by a combination of hardware and software modules in the decoding processor. The software module may be arranged in a storage medium in the memory 702, and the processor 701 reads the information in the memory 702 to perform the operations of the foregoing method in conjunction with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components for performing the foregoing methods.

According to the method for session establishment, the electronic device, and the storage medium provided by the embodiments of the present disclosure, the method includes that: the electronic device determines the RSC information, and determines, based on the RSC information, parameter information used to establish a relay session. In this way, the implementation of establishment of the relay session after introducing the RSC is clarified.

The present disclosure is described with reference to a flowchart and/or block diagram of a method, a device (system) and a computer program product according to the embodiments of the present disclosure. It is to be understood that each flow and/or block in the flow diagrams and/or block diagrams, and combinations of flow and/or block in the flow diagrams and/or block diagrams may be implemented by computer program instructions. These computer program instructions may be provided to a processor of a general-purpose computer, a special-purpose computer, an embedded processor or other programmable data processing device to produce a machine, such that the instructions executed by the processor of the computer or other programmable data processing device produce means for implementing the functions specified in one or more flows in the flowcharts and/or one or more blocks in the block diagrams.

These computer program instructions may also be stored in a computer-readable memory capable of directing a computer or other programmable data processing device to operate in a particular manner, such that the instructions stored in the computer-readable memory produce an article of manufacture including instruction means that perform the functions specified in one or more flows in the flowcharts and/or one or more blocks in the block diagrams.

These computer program instructions may also be loaded onto a computer or other programmable data processing device such that a series of operational operations are performed on the computer or other programmable device to produce a computer-implemented process, such that the instructions that execute on the computer or other programmable device provide operations for implementing the functions specified in one or more flows in the flowcharts and/or one or more blocks in the block diagrams.

It should be understood that the terms "system" and "network" in the present disclosure are used interchangeably. The term "and/or" in the present disclosure represents only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship.

The foregoing description is merely illustrative of the preferred embodiments of the present disclosure, and is not intended to limit the scope of the present disclosure. Any modifications, equivalents and improvements that fall within the spirit and principles of the present disclosure fall within the scope of the present disclosure.

The invention claimed is:

1. A method for session establishment, comprising:

receiving, by a relay device, Relay Service Code (RSC) information sent by a remote device during establishment of a PC5 connection; and determining, based on the RSC information, parameter information used to establish a relay session, wherein the parameter information of the relay session comprises a Protocol Data Unit (PDU) session type; and determining, based on the RSC information, the parameter information used to establish the relay session comprises:

determining, by the relay device according to a pre-configured rule, the parameter information used to establish the relay session corresponding to the RSC information, wherein the parameter information of the relay session further comprises network slice information and Data Network Name (DNN) information, the network slice information and the DNN information are determined respectively according to highest Nbit information and next highest Mbit information in the RSC information, wherein N and M are positive integers greater than or equal to 1.

2. The method of claim 1, wherein the relay device establishes a connection with the remote device through a sidelink.

3. The method of claim 1, wherein the pre-configured rule comprises at least one of:

a first number of bits of information in the RSC information corresponding to the first network slice information in the parameter information used to establish the relay session;

a second number of bits of information in the RSC information corresponding to the DNN information in the parameter information used to establish the relay session;

a third number of bits of information in the RSC information corresponding to Session Service Continuity (SSC) information in the parameter information used to establish the relay session; or a fourth number of bits of information in the RSC information corresponding to the PDU session type in the parameter information used to establish the relay session.

4. The method of claim 3, wherein a format of the RSC information is predetermined by a protocol, or configured through subscription information, or configured by a Public Land Mobile Network (PLMN).

5. The method of claim 1, wherein the pre-configured rule comprises at least one of:

RSC information configured in a service description information field of a User Equipment Routing Selection Policy (URSP) rule; or the parameter information used to establish the relay session configured in a route selection descriptor.

6. A relay device, comprising: a processor, a transceiver, and a memory configured to store a computer program executable by the processor, wherein the processor is configured to perform operations of:

controlling the transceiver to receive Relay Service Code (RSC) information sent by a remote device during establishment of a PC5 connection; and determining, based on the RSC information, parameter information used to establish a relay session, wherein the parameter information of the relay session comprises a Protocol Data Unit (PDU) session type; and determining, based on the RSC information, the parameter information used to establish the relay session comprises:

determining, by the relay device according to a pre-configured rule, the parameter information used to establish the relay session corresponding to the RSC information, wherein the parameter information of the relay session further comprises network slice information and Data Network Name (DNN) information, the network slice information and the DNN information are determined respectively according to highest Nbit information and next highest Mbit information in the RSC information, wherein N and M are positive integers greater than or equal to 1.

7. The relay device of claim 6, wherein the processor establishes a connection with the remote device through a sidelink.

8. The relay device of claim 6, wherein the pre-configured rule comprises at least one of:

a first number of bits of information in the RSC information corresponding to the network slice information in the parameter information used to establish the relay session;

a second number of bits of information in the RSC information corresponding to the DNN information in the parameter information used to establish the relay session;

a third number of bits of information in the RSC information corresponding to Session Service Continuity (SSC) information in the parameter information used to establish the relay session; or a fourth number of bits of information in the RSC information corresponding to the PDU session type in the parameter information used to establish the relay session.

9. The relay device of claim 8, wherein a format of the RSC information is predetermined by a protocol, or configured through subscription information, or configured by a Public Land Mobile Network (PLMN).

10. The relay device of claim 6, wherein the pre-configured rule comprises at least one of:

RSC information configured in a service description information field of a User Equipment Routing Selection Policy (URSP) rule; or the parameter information used to establish the relay session configured in a route selection descriptor.

11. A non-transitory storage medium having stored thereon computer-executable instructions that, when executed by a processor of a relay device, cause the processor to perform operations of:

receive Relay Service Code (RSC) information sent by a remote device during establishment of a PC5 connection; and determining, based on the RSC information, parameter information used to establish a relay session, wherein the parameter information of the relay session comprises a Protocol Data Unit (PDU) session type; and determining, based on the RSC information, the parameter information used to establish the relay session comprises:

determining, by the relay device according to a pre-configured rule, the parameter information used to establish the relay session corresponding to the RSC information, wherein the parameter information of the relay session further comprises network slice information and Data Network Name (DNN) information, the network slice information and the DNN information are determined respectively according to highest Nbit information and next highest Mbit information in the RSC information, wherein N and M are positive integers greater than or equal to 1.

12. The non-transitory storage medium of claim 11, wherein the relay device establishes a connection with the remote device through a sidelink.

13. The non-transitory storage medium of claim 11, wherein the pre-configured rule comprises at least one of:

a first number of bits of information in the RSC information corresponding to the network slice information in the parameter information used to establish the relay session;

a second number of bits of information in the RSC information corresponding to the DNN information in the parameter information used to establish the relay session;

a third number of bits of information in the RSC information corresponding to Session Service Continuity (SSC) information in the parameter information used to establish the relay session; or a fourth number of bits of information in the RSC information corresponding to the PDU session type in the parameter information used to establish the relay session.

14. The non-transitory storage medium of claim 13, wherein a format of the RSC information is predetermined by a protocol, or configured through subscription information, or configured by a Public Land Mobile Network (PLMN).

15. The non-transitory storage medium of claim 11, wherein the pre-configured rule comprises at least one of:

RSC information configured in a service description information field of a User Equipment Routing Selection Policy (URSP) rule; or the parameter information used to establish the relay session configured in a route selection descriptor.

16. The method of claim 1, wherein the parameter information of the relay session further comprises Session Service Continuity (SSC) information.

17. The relay device of claim 6, wherein the parameter information of the relay session further comprises Session Service Continuity (SSC) information.

18. The non-transitory storage medium of claim 11, wherein the parameter information of the relay session further comprises Session Service Continuity (SSC) information.

* * * * *